Sept. 15, 1959    A. P. BALZER    2,904,117
IMPLEMENT MOUNTING DEVICE FOR TRACTORS
Filed April 30, 1957    2 Sheets-Sheet 1

INVENTOR.
Abram P. Balzer
BY
Merchant & Merchant
ATTORNEYS

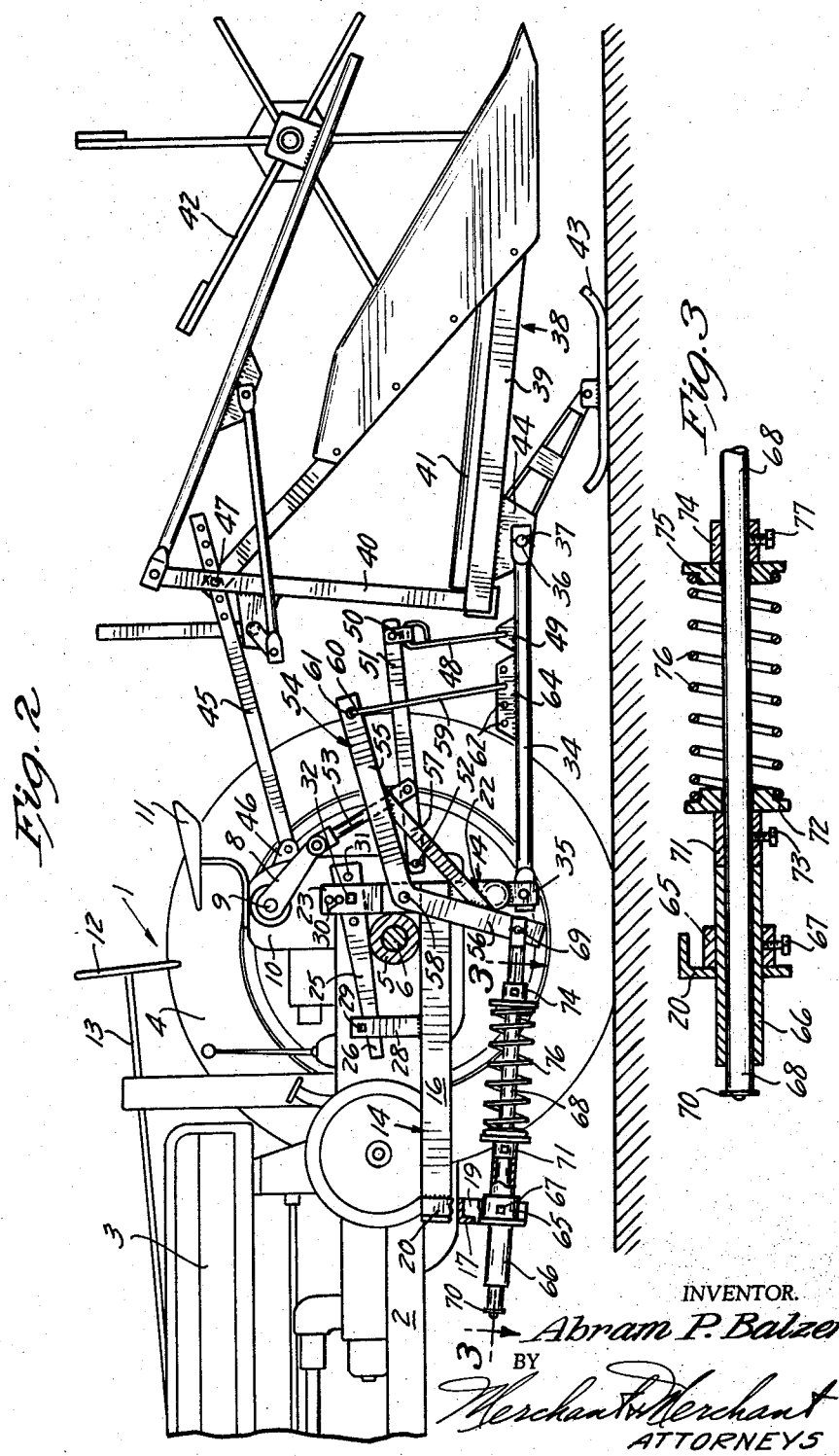

United States Patent Office 2,904,117
Patented Sept. 15, 1959

2,904,117

IMPLEMENT MOUNTING DEVICE FOR TRACTORS

Abram P. Balzer, Mountain Lake, Minn.

Application April 30, 1957, Serial No. 656,021

8 Claims. (Cl. 172—448)

My invention relates generally to agricultural machinery and more specifically to improvements in devices for mounting agricultural implements on tractors and the like.

An important object of my invention is the provision of a mounting device by means of which an implement, such as a windrower, may be quickly and easily attached to a tractor, and which may be as easily and quickly detached therefrom.

Another important object of my invention is the provision of an implement mounting device having anchoring elements adapted to engage spaced portions of the rear axle housing of a tractor to removably mount said device thereto.

Another object of my invention is the provision of an implement mounting device having an implement supporting arm movable in upward and downward directions to raise or lower the implement secured thereto and adapted for connection to elevating mechanism of a tractor for raising and lowering movements with respect thereto.

Another object of my invention is the provision of novel counter-balancing means whereby at least a portion of the weight of an implement secured to the mounting device is carried by said device, whereby to reduce the load carried by the lifting mechanism of a tractor.

Still another object of my invention is the provision of counter-balancing means as set forth which can be quickly and easily adjusted to compensate for loads of various weights.

A still further object of my invention is the provision of a mounting device as set forth which is simple and inexpensive to manufacture, which is highly efficient in operation, and which is extremely rugged in construction and durable in use.

The above, and still further highly important objects and advantages of my invention will become apparent from the following detailed specification, appended claims and attached drawings.

Referring to the drawings, which illustrate the invention, and in which like characters indicate like parts throughout the several views.

Fig. 2 is a view in side elevation of my improved mounting device, some parts of the tractor and implement being broken away and some parts shown in section; and Fig. 3 is an enlarged fragmentary detail in section taken substantially on the line 3—3 of Fig. 2.

Figure 1:
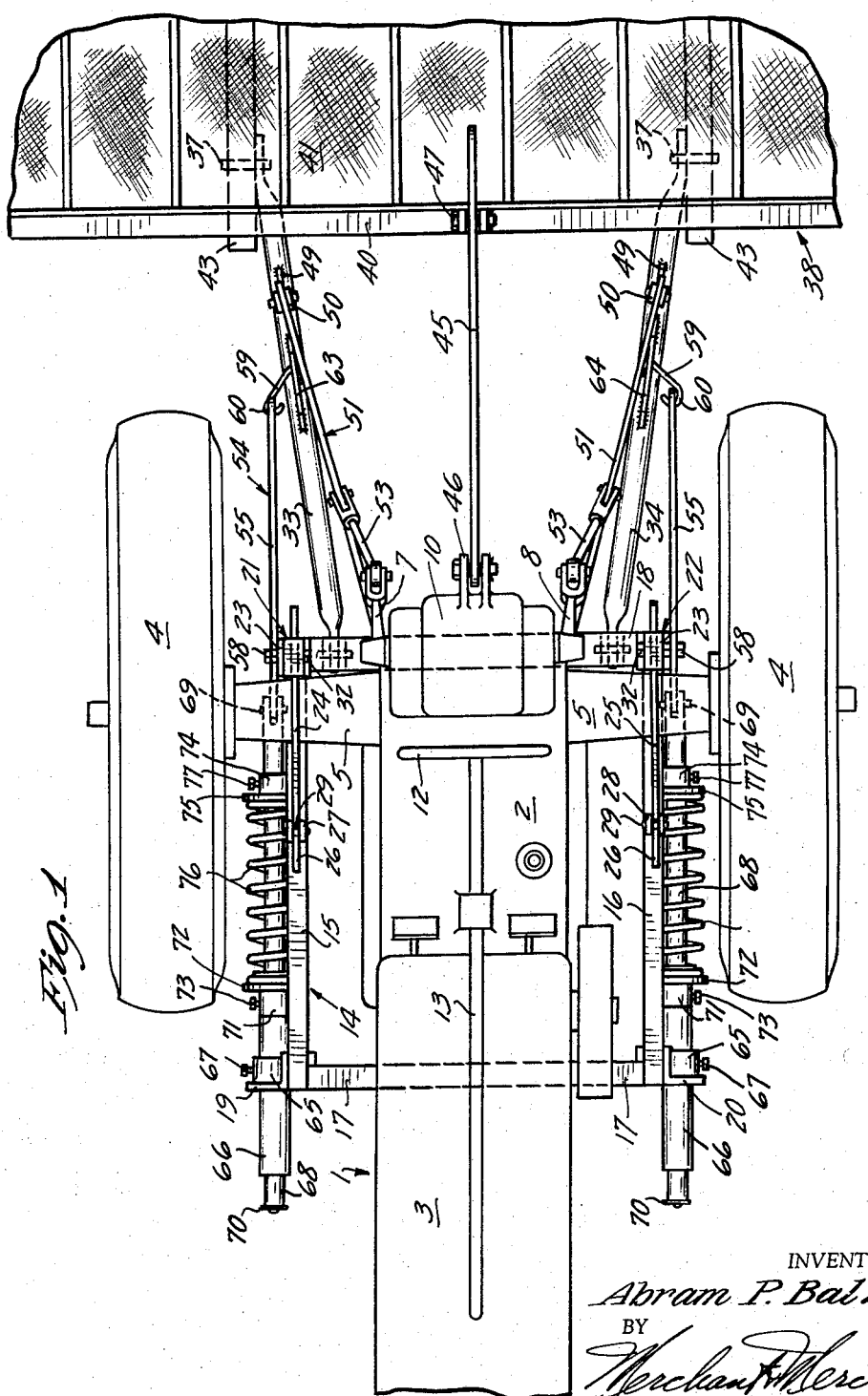
Fig. 1 is a view in top plan of my novel mounting device applied to a tractor and mounting an implement thereon, some parts being broken away.

Referring with greater detail to the drawings, numeral 1 indicates in its entirety a conventional tractor having a frame 2, an engine 3, the rear wheels 4 of the tractor being disposed at opposite ends of a transverse rear axle housing 5 and through which extends the drive shaft 6 of the tractor. The tractor 1 is further shown as including a pair of power operated crank-like lifting arms 7 and 8 which have their inner ends secured to a shaft 9 that is journalled in a gear box or the like 10 which may be assumed to contain the usual mechanism for imparting raising and lowered movements to the arms 7 and 8. The usual operator's seat is indicated at 11 in Fig. 2, and a steering wheel 12 is shown as being secured to the rear end of a steering rod 13.

My improved mounting device comprises a generally rectangular frame, indicated in its entirety by the numeral 14, said frame including a pair of laterally spaced parallel side members 15 and 16 and front and rear cross members 17 and 18 respectively. The frame 14 further includes a pair of depending hanger bars 19 and 20 that are welded or otherwise secured at their upper ends to the front ends of the side frame members 15 and 16 respectively, the cross member 17 being welded or otherwise rigidly secured at its opposite ends to the hanger bars 19 and 20. Welded or otherwise rigidly secured to the rear ends of the side frame members 15 and 16 are generally vertically disposed rear legs 21 and 22 respectively, the rear cross frame member 18 being welded or otherwise rigidly secured at its opposite ends to the legs 21 and 22 adjacent the lower ends thereof.

The upper end portions 23 of the legs 21 and 22 are bifurcated to receive a pair of wedge-shaped supporting bars 24 and 25 respectively, the relatively narrow front end portions 26 of the supporting bars 24 and 25 being receivable in upstanding bifurcated intermediate legs 27 and 28 which extend upwardly from the intermediate portions of their respective side frame members 15 and 16 in forwardly spaced relation to the rear legs 21 and 22. Said front end portions 26 of the supporting bars 24 and 25 underlie retaining pins or bolts 29 which connect the upper end of each of the bifurcated legs 27 and 28. The upper bifurcated ends 23 of the legs 21 and 22 are provided with rows of aligned apertures 30 that are selectively alignable with transverse apertures 31 in the rear end portions of the supporting bars 24 and 25, and locking bolts 32 are adapted to be passed through selected apertures 30 and 31 to releasably lock the rear end portions of the supporting bars 24 and 25 in their respective cooperating legs 21 and 22.

In mounting the frame 14 to the tractor 1, the supporting bars 24 and 25 are removed from the legs 21 and 27 and the legs 22 and 28 respectively, and the frame placed on the floor or ground below the tractor 1. The rear end portion of the frame 14 is then raised so that the legs 21 and 27 straddle the rear axle housing 5 adjacent one of the wheels 4, the legs 22 and 28 straddling the rear axle housing 5 adjacent the other wheel 4 of the tractor. Preferably, and as shown, the mounting frame 14 is so disposed with respect to the rear axle housing 5 that the top surfaces of the side frame members 15 and 16 engage adjacent bottom surface portions of the rear axle housing 5, whereas the rear legs 21 and 22 engage rear surface portions of the rear axle housing 5. With the frame 14 thus positioned, the wedge-shaped supporting bars 24 and 25 are placed between the bifurcated portions of their respective pairs of legs 21 and 27 and 22 and 28 so that the bottom surfaces of the supporting bars 24 and 25 engage the underlying top surface portions of the rear axle housing 5, and the locking bolt 31 inserted through aligned openings 30 and 31 in the legs and supporting bars respectively. As seen in Figure 2, the intermediate legs 27 and 28 are shorter than the upstanding portions of the rear legs 21 and 22, whereby the lower surfaces or edges of the supporting bars 24 and 25 converge forwardly with respect to their cooperating side frame members 15 and 16. This forward converging relationship between the supporting bars 24 and 25 and their respective side frame members 15 and 16 causes the rear axle housing 5 of the tractor to be held against the rear legs 21 and 22, and prevents forward movement of the tractor relative to the supporting frame 14. With the above described mounting arrangement, it will be noted that the frame 14 is capable of rotary or pivotal movement relative to the tractor 1 about the axis of the rear axle housing 5. However, and as will hereinafter become apparent, the weight of an implement secured to the mounting frame 14 will cause the front cross member 17 of the frame 14 to bear upwardly against the bottom of the tractor 1 forwardly of the rear axle housing 5 thereof.

A pair of generally horizontally disposed laterally spaced supporting arms 33 and 34 are pivotally connected at their front ends to bearing lugs or the like 35 secured to the rear cross frame member 18 for swinging movements about a common horizontal axis extending transversely of the supporting frame 14. As shown in Figure 1, the arms 33 and 34 diverge in a direction rearwardly of the tractor 1, and at their rear ends are provided with mounting apertures 36 for the reception of mounting pins or the like 37, by means of which an agricultural implement, such as a windrower or the like, indicated in its entirety by the numeral 38, may be secured to the rear ends of the arms 33 and 34. The implement 38 is conventional in nature, and in itself does not comprise the instant invention. Hence, in the interest of brevity, detailed showing and description thereof is omitted. It should suffice to note that the implement 38 comprises a generally horizontally disposed frame 39, a generally vertically disposed frame 40, an endless belt conveyor 41 carried by the horizontal frame 39, and a reel 42 supported from the upper end portion of the vertically disposed frame 40. The implement 38 is further shown as being provided with one or more ground engaging skids or the like 43, and the frame 39 is provided with a pair of mounting flanges 44 through which the mounting pins 37 extend. An adjustable stabilizer bar 45 is pivotally secured at its front end to the gear box 10, as indicated at 46, and is pivotally secured adjacent its rear end to the upper end portion of the frame 40 of the implement 38, as indicated at 47. For the purpose of raising and lowering the supporting arms 33 and 34 to adjust the elevation of the implement 38, I provide a pair of lifting links 48 that are pivotally connected at their lower ends to lugs or ears 49 welded or otherwise rigidly secured to the arms 33 and 34 intermediate their ends. The upper ends of the lifting links 47 are provided with clevises or the like 50 that are releaseably locked to the rear ends of levers 51 the front ends of which are pivotally secured to the tractor as indicated at 52. Supplementary links 53 are connected to the intermediate portions of the levers 51 and to respective ones of the crank arms 7 and 8 of the tractor. The levers 51 and supplementary links 53 form a part of the lifting mechanism of the tractor and are furnished therewith.

A pair of like bell-crank levers 54, each comprising lever arms 55 and 56 and brace members 57, are pivotally mounted each to a different one of the legs 21 and 22, as indicated at 58, for swinging movements on aligned horizontal axes. Lifting links 59 have hooked upper ends 60 which project through openings 61 in the outer ends of the lever arms 55. The lower ends of the lifting links 59 are hooked through selected ones of a plurality of apertures 62 in upstanding flanges 63 and 64 on the intermediate portions of the arms 33 and 34 respectively.

The lower ends of the hanger bars 19 and 20 are provided with bearing bosses 65 in which are slidably mounted a pair of abutment forming guide tubes or the like 66. The guide tubes 66 each extend in directions generally parallel to their adjacent side frame members 15 and 16 and are releasably locked against axial sliding movements in their respective bearing bosses 65 by set screws or the like 67. One each of a pair of elongated thrust bars or the like 68 are mounted for longitudinal sliding movements in each of the tubular members 66, the rear ends of each of said thrust bars 68 being pivotally secured to the outer or lower end of a different one of the bell-crank lever arms 56, as indicated at 69. At their front ends, the thrust bars 68 are provided with stop collars 70 which engage the front ends of the tubular members 66 to limit rearward movement of the thrust bars 68. A pair of collars 71 having flanges 72 at one end are slidably mounted one each on a different one of the thrust bars 68, and are each provided with a set screw or the like 73 whereby the collars 71 may be releasably locked against axial sliding movement on their respective thrust bars 68. As shown, each of the collars 71 is adapted to make abutting engagement with an adjacent one of the guide members 66. A second pair of collars 74 are slidably mounted one each on each of the thrust bars 68 in rearwardly spaced relation to the collars 71, and are provided with abutment forming flanges 75, between which and the flanges 72 are interposed coil compression springs 76. The collars 74 are each provided with set screws or the like 77 by means of which the collars 74 with their flanges 75 are releasably locked on their respective thrust bars 68. With the abutment forming tubular members 66 locked in place by their respective set screws 67, and with the abutment collars 74 being also locked in place by their respective set screws 77, and the set screws 73 of the collars 71 being loosened, the coil compression springs 76 exert yielding bias against the thrust rods 68 in a direction rearwardly with respect to the tractor 1 to swing the bell-crank levers 54 in a counterclockwise direction with respect to Figure 1 to urge the arms 33 and 34 and the windrower 38 secured thereto in an upward direction. The amount of yielding bias exerted by the springs 76 is varied by longitudinal adjustment of the tubular members 66 relative to their respective bearing bosses 65.

When my novel mounting device is applied to a tractor as above described, and it is desired to mount an implement such as the windrower 38, the set screws 67, 73 and 77 are all loosened to permit free downward swinging movement of the supporting arms 33 and 34 when the power operated lifting arms 7 and 8 are swung in a clockwise direction with respect to Fig. 2. The implement 38 is then fastened to the rear ends of the lifting arms 33 and 34 and the stabilizer bar 45 is connected to the upper end portion of the implement 38 as indicated at 47. When the implement 38 has been thus secure, the power operated crank arms 7 and 8 are caused to swing in an upward direction to raise the lifting arms 33 and 34 and the implement 38 to an elevated position not shown. The abutment forming tubular members 66 are moved rearwardly by engagement of the stop flanges 70 with the front ends of the tubular members 66 during such raising movement of the arms 33 and 34, and when the said arms 33 and 34 are in their raised positions, the set screws 67 are tightened to frictionally lock the tubular members 66 against axial movement in the bearing bosses 65. The collars 71 and 74, together with the springs 76 are then moved axially forwardly until the collars 71 make abutting engagement with the rear ends of the tubular members 66, after which the set screws 77 are tightened to lock the collars 74 against axial movement with respect to the thrust bars 68. Then, when the power operated lever arms 7 and 8 are caused to be moved in a direction to permit lowering of the arms 33 and 34 together with the implement 38, the counter-balancing springs 76 are compressed to partially support the load of the arms 33 and 34 together with the implement 38. If it is considered that this partial support is not sufficient to properly relieve excessive lifting strain on the crank arms 7 and 8 and operating mechanism therefor, the set screws 73 are tightened and the crank arms 7 and 8 again cause to operate to lift the arms 33 and 34 and the implement 38 to a raised position. This will cause the collars 71 to be moved away from the adjacent ends of the abutment forming tubular members 66. With the arms 33 and 34 and the implement 38 in said raised positions, the set screws 67 are loosened and the tubular members 66 manually moved rearwardly into abutting engagement with their respective abutment collars 71 and the set screws re-tightened to lock the tubular members 66 in their new position substantially as shown in the drawings. The set screws 73 of the collars 71 are then loosened and the crank arms 7 and 8 moved in a direction to permit downward movement of the lifting arms 33 and 34 and the implement 38 carried thereby. Inasmuch as the springs 76 were held in a partially compressed position when the lifting arms 33 and 34 were raised the second time, said springs are further compressed during the last-mentioned lowering of the arms 33 and 34 together with the implement 38, whereby to exert a substantially greater counter-balancing effort than under the first adjustment. Obviously, inasmuch as the springs 76 are independently adjustable, either thereof may be adjusted to compensate for any lateral unbalance which may be present in the implement mounted thereon.

While I have shown a windrower attached to my novel mounting device, it should be obvious that the mounting device is capable of supporting various agricultural implements. When the weight of the implement is applied to the lifting arms 33 and 34, the front cross frame member 17 is caused to bear upwardly against the bottom of the tractor 1. Obviously, with the windrower 38 applied to the tractor 1 as shown, the tractor will be driven in reverse to properly operate the windrower. In instances where a considerable amount of such reverse operation of the tractor is necessary, the position of the seat 11 of the tractor may be suitably changed so that the operator may enjoy a more comfortable operating position.

My novel implement mounting means has been thoroughly tested and found to be completely satisfactory for the accomplishment of the objectives set forth; and while I have shown and described a commercial embodiment of my novel mounting means, it will be understood that the same is capable of modification without departure from the spirit and scope of the invention as defined in the claims.

What I claim is:

1. An implement mounting device for tractors, comprising, a frame, means for detachably securing said frame to the rear axle housing of a tractor, a supporting arm pivotally mounted at its front end to said frame on a horizontal axis and extending generally rearwardly thereof, said arm having means at its rear end for securing an implement thereto, linkage intermediate the ends of said arm for attachment to elevating mechanism of a tractor whereby the rear end of said arm may be raised and lowered, a lever pivotally secured intermediate its ends to said frame, a lifting link connected to one end of said lever and to said supporting arm intermediate the ends thereof, a counter-balancing spring interposed between the other end of said lever and said frame and yieldingly urging said lever in a direction to swing said arm upwardly about its axis of pivotal movement, and means for varying the yielding bias exerted by said spring on said lever.

2. An implement mounting device for tractors, comprising, a frame including a pair of laterally spaced side members and a cross member, means for detachably securing said frame to a tractor with said side members engaging laterally spaced portions of the rear axle housing of the tractor and said cross member engaging the bottom portion of the tractor forwardly of said rear axle housing, a supporting arm pivotally connected at its front end to the rear end portion of said frame on a horizontal axis and extending generally rearwardly from said frame, said arm having means on its rear end for securing an implement thereto, linkage intermediate the ends of said arm for attachment to elevating mechanism of the tractor whereby the rear end of said arm may be raised or lowered, a lever pivotally secured intermediate its ends to the rear end portion of said frame, a lifting link connected to one end of said lever and to said supporting arm intermediate the ends thereof, a thrust bar, means mounting said thrust bar for longitudinal sliding movements in the front end portion of said frame in generally parallel spaced relation to one of said side members and including an abutment element, the rear end of said thrust bar being pivotally connected to said lever, a second abutment element mounted on said thrust bar in rearwardly spaced relation to said first-mentioned abutment element, and a coil compression spring encompassing said thrust bar, the opposite ends of said spring bearing against said abutment elements in directions to yieldingly urge said bar and lever in a direction to swing said arm upwardly about its axis of pivotal movement.

3. The structure defined in claim 2 in which said thrust bar mounting means is mounted on said frame for adjusting movements relative to said frame in a direction longitudinally of said thrust bar, said second adjustment element being releasably locked on said thrust bar for independent adjustment longitudinally of said thrust bar.

4. An implement mounting device for tractors, comprising, a generally rectangular frame including a pair of laterally spaced side members and a cross member, means for detachably securing said frame to a tractor with said side members engaging laterally spaced portions of the rear axle housing of the tractor and said cross bar engaging the bottom portion of the tractor forwardly of said rear axle housing, a pair of laterally spaced rearwardly diverging supporting arms having means on their rear ends for securing an implement thereto, means mounting the front ends of said arms to the rear end portion of said frame for swinging movements about a common horizontal axis extending transversely of said frame, linkage intermediate the ends of said arms for attachment to elevating mechanism of the tractor whereby the rear ends of said arms may be raised or lowered, a pair of levers pivotally secured intermediate their ends to opposite sides of said frame adjacent the rear end thereof, a pair of lifting links each connected to one end of a respective lever and to respective one of said supporting arms intermediate the ends thereof, a pair of thrust bars, means mounting each of said thrust bars for longitudinal sliding movements in the front end portion of said frame in closely spaced generally parallel relation to a different one of said side members and including abutment elements each slidably encompassing a different one of said thrust bars, a pair of second abutment elements mounted one each on each of said thrust bars in rearwardly spaced relation to first-mentioned abutment elements, and a pair of coil compression springs one each encompassing a different one of said thrust bars and interposed between the abutment elements thereon and bearing thereagainst in directions to yieldingly urge said thrust bars and levers in a direction to swing said arms upwardly about their common axis of pivotal movement, the abutment elements associated with each of said thrust bars being independently adjustably movable in directions longitudinally of said thrust bars, whereby the yielding bias of said springs may be equalized.

5. An implement mounting device for tractors comprising a frame including a pair of laterally spaced side members and a cross member; means for detachably securing said frame to a tractor with said side members engaging laterally spaced portions of the rear axle housing of the tractor and said cross member and engaging the bottom portion of the tractor forwardly of said rear axle housing; said means comprising a pair of generally vertical legs rigidly connected to and extending upwardly from each of said side frame members in longitudinally spaced relationship and straddling said rear axle housing, and a pair of supporting bars each anchored at opposite end portions to the vertical legs of a different one of said pairs of legs and adapted to engage top surface portions of said rear axle housing, said supporting bars each being detachably anchored to at least one of its associated vertical legs, and said supporting bars having lower axle housing engaging surfaces which converge with underlying axle housing engaging upper surface portions of their respective side frame members in a direction forwardly with respect to the tractor whereby to retain said rear axle housing in engagement with the rear ones of said legs and to limit forward movement of said axle housing with respect to said frame and permitting limited pivotal movement of said frame with respect to said rear axle housing about the axis thereof.

6. The structure defined in claim 5 in which each of said supporting bars is adjustably anchored to its associated vertical legs for disposition in a plurality of vertically spaced positions relative to its respective side member to accommodate different sized rear axle housings.

7. An implement mounting device for tractors comprising a frame including a pair of laterally spaced side members and a cross member; means for detachably securing said frame to a tractor with said side members engaging laterally spaced portions of the rear axle housing of the tractor and said cross member engaging the bottom portion of the tractor forwardly of said rear axle housing; said means comprising a pair of generally vertical legs rigidly connected to and extending upwardly from each of said side frame members in longitudinally spaced relationship and straddling said rear axle housing, and a pair of supporting bars each anchored at opposite end portions to the vertical legs of a different one of said pairs of legs and adapted to engage top surface portions of said rear axle housing, said supporting bars each being detachably anchored to at least one of its associated vertical legs, said supporting bars having lower axle housing engaging surfaces which converge with underlying axle housing engaging upper surface portions of their respective side frame members in a direction forwardly with respect to the tractor whereby to retain said rear axle housing in engagement with the rear ones of said legs and to limit forward movement of said axle housing with respect to said frame and permitting limited pivotal movement of said frame with respect to said rear axle housing about the axis thereof; a supporting arm pivotally connected at its front end to the rear end portion of said frame on a horizontal axis and extending generally rearwardly from said frame; said arm having means on its rear end for securing an implement thereto; linkage intermediate the ends of said arm for attachment to elevating mechanism of the tractor whereby the rear end of said arm may be raised or lowered; and an adjustable counterbalance mechanism carried by said frame and connected to said arm and operative to carry at least a portion of the weight of the implement secured to said arm.

8. The structure defined in claim 7 in further combination with a lever pivotally secured intermediate its ends to said frame; a lifting link connected to one end of said lever and to said supporting arm intermediate the ends thereof; said counterbalancing mechanism comprising a spring interposed between the other end of said lever and said frame and yieldingly urging said lever in a direction to swing said arm upwardly about its axis of pivotal movement; and means for varying the yielding bias exerted by said spring on said lever.

References Cited in the file of this patent
UNITED STATES PATENTS

| | | |
|---|---|---|
| 2,222,115 | Mott | Nov. 19, 1940 |
| 2,656,776 | Cox et al. | Oct. 27, 1953 |